US008717788B2

(12) United States Patent
Chen et al.

(10) Patent No.: US 8,717,788 B2
(45) Date of Patent: May 6, 2014

(54) METHOD AND SYSTEM FOR CONTROLLING A POWER CONVERTER SYSTEM CONNECTED TO A DC-BUS CAPACITOR

(75) Inventors: Chingchi Chen, Ann Arbor, MI (US);
Michael W. Degner, Novi, MI (US);
Satish Thuta, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 574 days.

(21) Appl. No.: 13/044,655

(22) Filed: Mar. 10, 2011

(65) Prior Publication Data

US 2012/0230070 A1  Sep. 13, 2012

(51) Int. Cl.
*H02H 7/122* (2006.01)

(52) U.S. Cl.
USPC .......................................... 363/56.01; 363/71

(58) Field of Classification Search
CPC ...................................................... H02M 1/15
USPC .............. 363/50, 55, 56.01, 56.02, 65, 66–71
See application file for complete search history.

(56) References Cited

U.S. PATENT DOCUMENTS

| | | | |
|---|---|---|---|
| 4,990,844 A | 2/1991 | Gritter et al. | |
| 6,023,417 A | 2/2000 | Hava et al. | |
| 6,154,379 A | 11/2000 | Okita | |
| 6,307,759 B1 | 10/2001 | Inarida et al. | |
| 6,307,761 B1 * | 10/2001 | Nakagawa | 363/65 |
| 6,392,905 B1 | 5/2002 | Huang et al. | |
| 6,751,105 B2 | 6/2004 | Yamanaka et al. | |
| 7,035,125 B2 * | 4/2006 | Yoshida | 363/71 |
| 7,593,243 B2 | 9/2009 | Ganev et al. | |
| 7,835,165 B2 * | 11/2010 | Hatanaka | 363/69 |
| 8,416,595 B2 * | 4/2013 | Hasler | 363/87 |
| 8,456,875 B2 * | 6/2013 | Li et al. | 363/65 |
| 2005/0270806 A1 | 12/2005 | Zhu | |
| 2007/0080659 A1 | 4/2007 | Urakabe et al. | |
| 2008/0084716 A1 | 4/2008 | Ganev et al. | |
| 2009/0027933 A1 | 1/2009 | Kajouke et al. | |

OTHER PUBLICATIONS

Hava, Ahmet M., et al., A High Performance Generalized Discontinuous PWM Algorithm, IEEE Applied Power Electronics Conference, Feb. 1997, pp. 886-891, vol. 2, Atlanta, Georgia, Feb. 1997.
Gowri, K. Sri, et al., Novel Space Vector Based Generalized Discontinuous PWM Algorithm For INduction Motor Drives, ARPN Journal of Engineering and Applied Sciences, Feb. 2009, pp. 76-88, vol. 4, No. 1, India.

* cited by examiner

*Primary Examiner* — Matthew Nguyen
(74) *Attorney, Agent, or Firm* — David B. Kelley; Brooks Kushman P.C.

(57) ABSTRACT

A method and system for controlling a power converter system with a direct current (DC)-bus capacitor connected to at least a first converter and a second converter. The first converter is with associated first current and the second converter is with associated second current. Switching states of the first and second converters are determined. The switching states of the second converter are sequenced relative to the first converter to reduce a difference of sums of the associated first and second currents between adjacent time intervals.

18 Claims, 6 Drawing Sheets

METHOD AND SYSTEM FOR CONTROLLING A POWER CONVERTER SYSTEM CONNECTED TO A DC-BUS CAPACITOR

BACKGROUND

1. Technical Field

The present invention generally relates to controlling power converter systems.

2. Background Art

The need or desire to reduce DC bus ripple current in a power conversion system is well known. A high ripple current can increase the temperature of the components connected to a direct current (DC)-bus as well as increase an amount of electromagnetic interference generated by the power conversion system. Furthermore, a high ripple current can degrade the operation or life of components in the power conversion system as well as decrease the durability or performance of the power conversion system.

A capacitor used to filter ripple current in a power conversion system can be a relatively expensive component. Larger capacitors are often used as the expected level of ripple current flowing through the DC bus increases. However, the expense of the capacitor increases as the size of the capacitor increases. Thus, it may be desirable to reduce the expected DC bus ripple current in the power conversion system which allows the power conversion system to use a smaller DC-bus capacitor. The smaller DC-bus capacitor can reduce the weight, size, cost, and volume of the power conversion system.

SUMMARY

Various embodiments of a system or method for controlling a power converter system with a direct current (DC)-bus capacitor connected to at least a first converter with associated first current and a second converter with associated second current determine switching states of the first and second converters and sequence the switching states of the second converter relative to the first converter to reduce a difference of sums of the associated first and second currents between adjacent time intervals.

DETAILED DESCRIPTION

Embodiments of the present disclosure generally provide a method and system for controlling a power converter system with a direct current (DC)-bus capacitor connected to at least a first converter and a second converter. In operation, the power converter system is controlled to reduce ripple current flowing through the DC-bus capacitor. As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
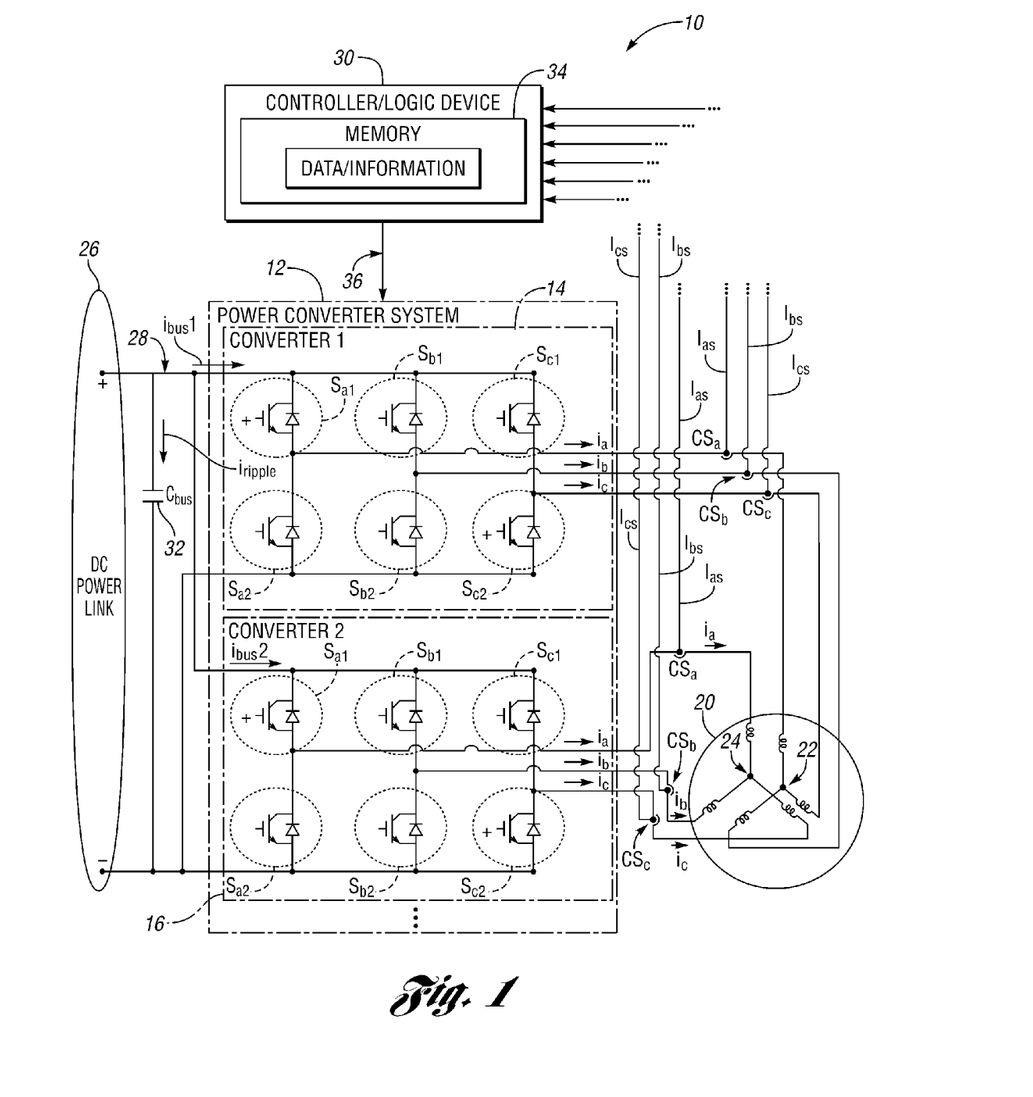
FIG. 1 is a schematic diagram illustrating a system for controlling a power converter system including at least two converters connected to a direct current (DC)-bus capacitor in accordance with one embodiment.
Figure 2:
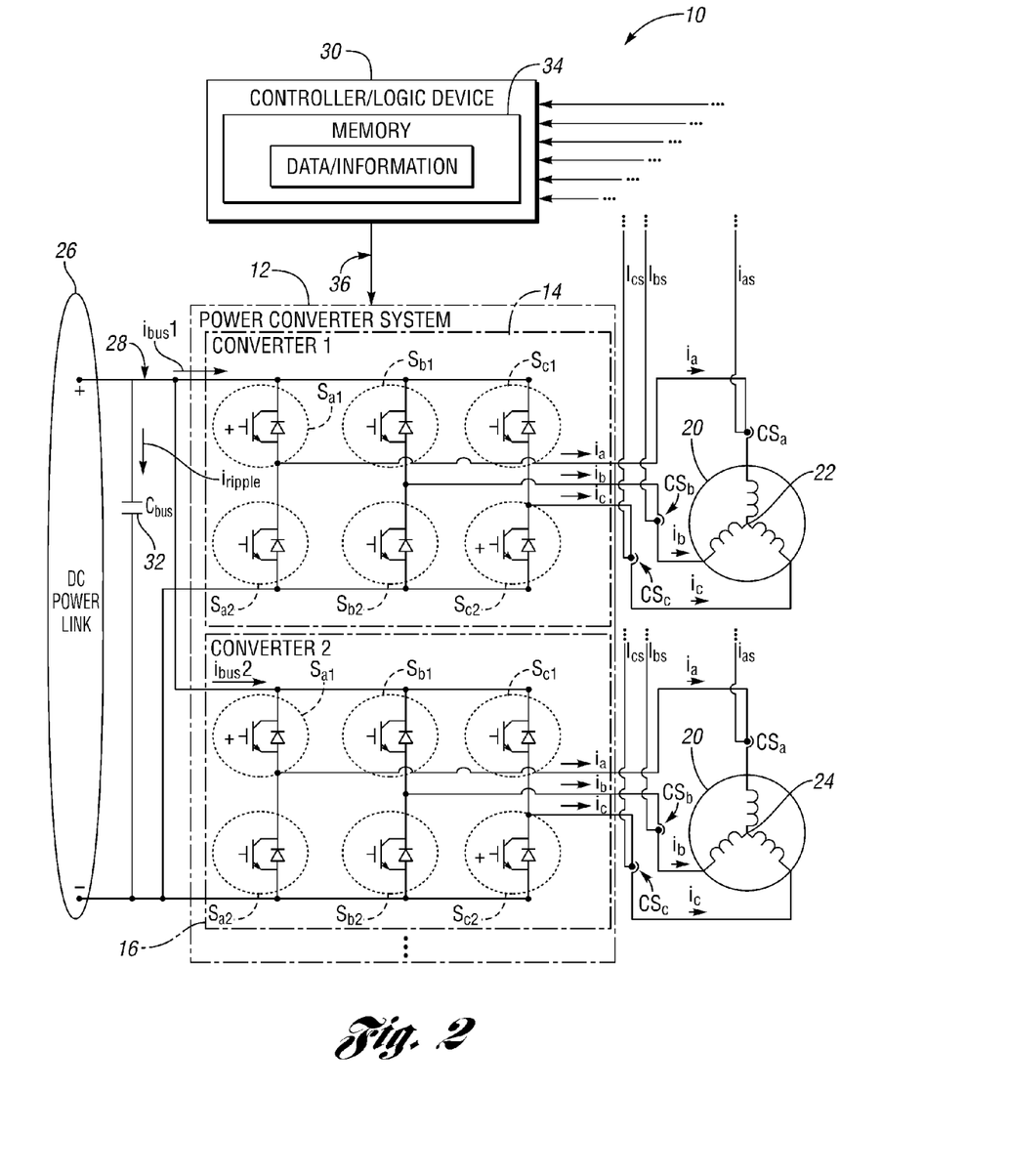
FIG. 2 is a schematic diagram like FIG. 1, but showing the converters driving separate alternating-current (AC) machines.

With reference to FIGS. 1-2, a system 10 is provided for controlling a power converter system 12. The power converter system 12 of FIGS. 1-2 are shown to include a first converter 14 and a second converter 16.

While the first and second converters 14, 16 are shown as three-phase converters, the first and second converters 14, 16 may include additional or fewer phase legs. For example, the first converter 14 may be a four-phase converter, a five-phase converter, a six-phase converter, etc. Similarly, the second converter 16 may be a four-phase converter, a five-phase converter, a six-phase converter, etc.

While the power converter system 12 is shown to include two power converters 14, 16, the power converter system 12 may include additional converters. Thus, the system 10 may control three or more converters in the power converter system 12.

As shown in FIGS. 1-2, the converters 14, 16 are coupled to a DC bus 28 and the DC bus 28 is coupled to a DC power link 26 and a DC-bus capacitor 32. The DC power link 26 may include a DC storage battery to provide DC power to the DC bus 28. For example, the DC storage battery may be a high-voltage storage battery used in a vehicle with electrified power trains, such as a hybrid electric vehicle. The DC-bus capacitor 32 of FIGS. 1-2 is shown separate from the power converter system 12. However, the DC-bus capacitor 32 may be integrated as part of the power converter system 12.

While the converters 14, 16 of FIGS. 1-2 are shown as drive system inverters, each of the converters 14, 16 may be any type of converter. For example, each of the converters 14, 16 may operate as DC-to-AC converters with first, second, and third phase legs having respective phase currents $i_a$, $i_b$, and $i_c$, as illustrated in FIGS. 1-2. In operation, the DC-to-AC converters 14, 16 receive DC power from the DC power link 26 through the DC bus 28 and convert the DC power to AC power. Furthermore, the AC power is transmitted via the phase currents $i_a$, $i_b$, and $i_s$ to drive at least one AC machine 20.

As illustrated in FIGS. 1-2, the AC machine 20 may be a three-phase permanent-magnet synchronous motor (PMSM) with two sets of windings, which are generally referenced by reference numerals 22, 24. Each of sets of windings 22, 24 has multiple phases as depicted in FIGS. 1-2. In another example, the converters 14, 16 may operate as AC-to-DC converters that convert AC power from the AC machine 20 (e.g., generator) to DC power, which the DC bus 28 can provide to the DC power link 26.

FIG. 2 is a schematic diagram like FIG. 1, but showing the first converter 14 controlling one AC machine 20 and the second converter 16 controlling a second AC machine 20'. Like in FIG. 1, the system 10 of FIG. 2 is provided for controlling the power converter system 12, which may be different from the power converter system 12 of FIG. 1 depending on the power electronic topology of the system 10.

While the two sets of windings 22, 24 in the AC machine 20 of FIG. 1 and the AC machines 20, 20' of FIG. 2 are shown in a wye configuration, the sets of windings 22, 24 may be in different configurations, such as both sets of windings 22, 24 in a delta configuration, the first set of windings 22 in a delta configuration and the second set of windings 24 in a wye configuration, or other circuit configurations depending on the AC machine 20 in FIG. 1 and the AC machines 20, 20' in FIG. 2.

The system 10 may control the power converter system 12 in other power electronic topologies. For example, the power converter system 12 may be an AC-to-DC-to-AC converter with the first converter 14 operating as an AC-to-DC converter and the second converter 16 operating as a DC-to-AC converter. The first converter 14 is between a first AC machine (i.e., a generator) and the second converter 16, and the second converter 16 is between the first converter 14 and a second AC machine (i.e., an electric motor). In another example, the first converter 14 may be a single leg bi-directional DC-to-DC converter and the second converter 16 may be a three-phase converter.

With reference to FIGS. 1-2, each the converters 14, 16 includes power switches $S_{a1}$, $S_{a2}$, $S_{b1}$, $S_{b2}$, $S_{c1}$, and $S_{c2}$. The power switches may be implemented by various types of controllable switches. For example, each power switch may include a diode and an electronic switch, such as an IGBT. Power switches $S_{a1}$, $S_{a2}$ are part of phase leg A of the converters 14, 16. Similarly, power switches $S_{b1}$, $S_{b2}$ are part of phase leg B and power switches $S_{c1}$, $S_{c2}$ are part of phase leg C of the converters 14, 16. While each of the converters 14, 16 are shown to include six power switches, the converters 14, 16 may include any number of power switches depending on the particular configuration of the power converter system 12.

As illustrated in FIGS. 1-2, current sensors $CS_a$, $CS_b$, and $CS_c$ are provided for each of the converters 14, 16 to sense current flow in the respective phase legs A, B, and C. FIG. 1 shows the current sensors $CS_a$, $CS_b$, and $CS_c$ separate from the power converter system 12. However, current sensors $CS_a$, $CS_b$, and $CS_c$ may be integrated as part of the power converter system 12 depending on its configuration.

Current sensors $CS_a$, $CS_b$, and $CS_c$ of FIGS. 1-2 are installed in series with each of phase legs A, B and C and provide the respective feedback signals $i_{as}$, $i_{bs}$, and $i_{cs}$ (also illustrated in FIG. 1) for the system 10. The feedback signals $i_{as}$, $i_{bs}$, and $i_{cs}$ may be raw current signals processed by a logic device (LD) 30 or may be embedded or encoded with data or information about the current flow through the respective phase legs. In operation, the feedback data/signals represented by $i_{as}$, $i_{bs}$, and $i_{cs}$ can indicate a direction of current flow, a magnitude of current flow, or both a direction and magnitude of current flow through the respective phase legs A, B, and C in the respective converters 14, 16.

As shown in FIGS. 1-2, the net current from the DC power link 26 to the first converter 14 is shown as current flow $i_{bus1}$. Similarly, the net current from the DC power link 26 to the second converter 16 is shown as current flow $i_{bus2}$. Changing the switching states of one or more of the power switches $S_{a1}$, $S_{a2}$, $S_{b1}$, $S_{b2}$, $S_{c1}$, and $S_{c2}$ in the converters 14, 16 changes the switching configuration of the respective converters 14, 16 and therefore how the net currents $i_{bus1}$, $i_{bus2}$ flow relative to the first and second converters 14, 16. The net currents $i_{bus1}$, $i_{bus2}$ can be determined or calculated based on the feedback signals $i_{as}$, $i_{bs}$, and $i_{cs}$ indicating current flow through the respective phase legs A, B, and C for the first and second sets of windings 22, 24 of the AC machine 20 in FIG. 1 or the AC machines 20, 20' in FIG. 2.

Referring again to FIGS. 1-2, the system 10 includes a logic device (LD) or controller 30. The controller or LD 30 can be implemented by various types or combinations of electronic devices and/or microprocessor-based computers or controllers. To implement a method of controlling the power converter system 12, the controller 30 may execute a computer program or algorithm embedded or encoded with the method and stored in volatile and/or persistent memory 34. Alternatively, logic may be encoded in a logic or gate array stored on one or more integrated circuit chips.

As shown in the embodiments of FIGS. 1-2, the controller 30 receives and processes the feedback signals $i_{as}$, $i_{bs}$, and $i_{cs}$ to control the phase currents $i_a$, $i_b$, and $i_c$ such that the phase currents $i_a$, $i_b$, and $i_s$ flow through the respective phase legs A, B, and C and into the respective sets of windings 22, 24 according to various current or voltage patterns. For example, current patterns can include patterns or sequences of phase currents $i_a$, $i_b$, and $i_c$ flowing into and away from the DC-bus 24 or the DC-bus capacitor 32. Thus, the controller 30 can change the switching configuration of the respective converters 14, 16 to change how net currents $i_{bus1}$, $i_{bus2}$ flow with respect to the first and second converters 14, 16.

As shown in FIG. 1, a storage medium 34 (hereinafter "memory"), such as computer-readable memory may store the computer program or algorithm embedded or encoded with the method. In addition, the memory 34 may store data or information about the various operating conditions of components in the power converter system 12. For example, the memory 34 may store data or information about current flow through the respective phase legs. The memory 34 can be part of the controller 30 as shown in FIG. 1. However, the memory 34 may be positioned in any suitable location accessible by the controller 30.

The controller 30 can obtain preliminary switching states of the first and second converters 14, 16 based on, for example, desired voltage inputs for the first and second sets of windings 22, 24. The desired voltage inputs are based on how the AC machine 20 in FIG. 1 is or the AC machines 20, 20' are commanded or expected to operate. Furthermore, the desired voltage inputs may indicate a desired voltage level for each of the sets of windings 22, 24 over a switching interval or moving window. The switching states of the first and second converters 14, 16 include active states and reactive states that determine the desired voltage level outputted from the converters 14, 16. The voltage level in the sets of windings 22, 24 can change over the switching interval and, therefore, the desired voltage level may be an average of the voltage levels to occur in the sets of windings 22, 24 over the switching interval.

Once the preliminary switching states of the first and second converters 14, 16 are obtained, the controller 30 sequences the preliminary switching states of the second converter 16 relative to the first converter 14, or vice versa. Sequencing the preliminary switching states of the second converter 16 relative to the first converter 14 still allows the system 10 to deliver, for example, the desired voltage inputs for the first and second sets of windings 22, 24.

The controller 30 sequences the preliminary switching states to reduce a difference of sums of the net currents $i_{bus1}$, $i_{bus2}$ associated with the first and second converters 14, 16 between adjacent time intervals. Reducing the difference of sums of the net currents $i_{bus1}$, $i_{bus2}$ between adjacent time intervals reduces ripple current in the DC-bus capacitor 32. One or more time intervals of current fluctuation may be included in the switching interval of the first and second converters 14, 16. These strategies are explained by example in current diagrams illustrating net currents $i_{bus1}$, $i_{bus2}$ associated with the first and second converters 14, 16, as shown in FIGS. 3a-3e and 4a-4f.

As shown in FIGS. 3a-3e and 4a-4f, the DC bus currents $i_{bus1}$, $i_{bus2}$ from converters 14, 16 are with average values $I_{av1}$ and $I_{av2}$, respectively. The total average current back to the DC bus 28 is simply represented as $I_{av1}+I_{av2}$. Sequencing the switching states essentially changes neither the average currents $i_{bus1}$, $i_{bus2}$, nor the total average sum $I_{av1}+I_{av2}$. However, sequencing the states of the converters 14, 16 can reduce the fluctuation of the sum (i.e., $i_{bus1}+i_{bus2}$) away from $I_{av1}+I_{av2}$, which reduces the ripple current in the capacitor 32. One possible way to realize this result is, in general, to select one switching state from the first converter 14 which is associated with one current amplitude, and pick the best-matching switching state from the second converter 16 with a current amplitude, which makes the sum of these two currents closest to the overall average current, i.e., $I_{av1}+I_{av2}$. This process continues until all states have been sequenced for a given time interval. In another example, the states of the first converter 14 with descending current amplitudes may be sequenced and then matched with the current from the second converter 16 with ascending amplitudes, or vise versa. These concepts are further explained and illustrated by the following examples.

Figure 3A:
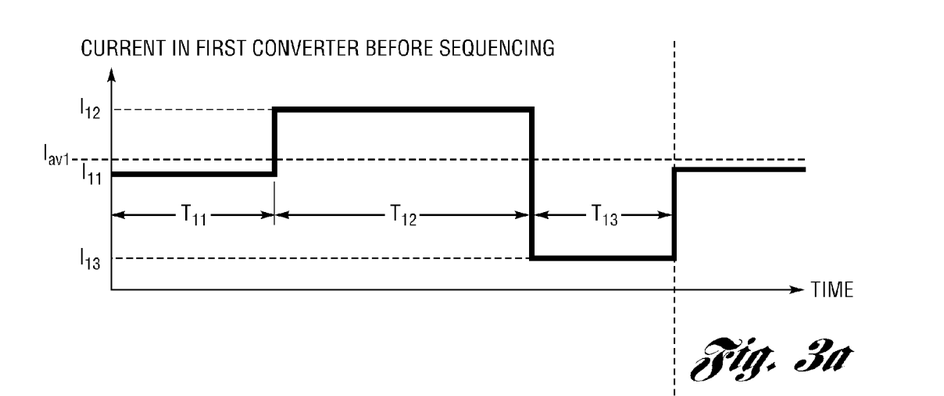
FIG. 3a is a current diagram illustrating current flow in the first converter with period T without switching states of the first converter being sequenced in accordance with one embodiment.
Figure 3B:
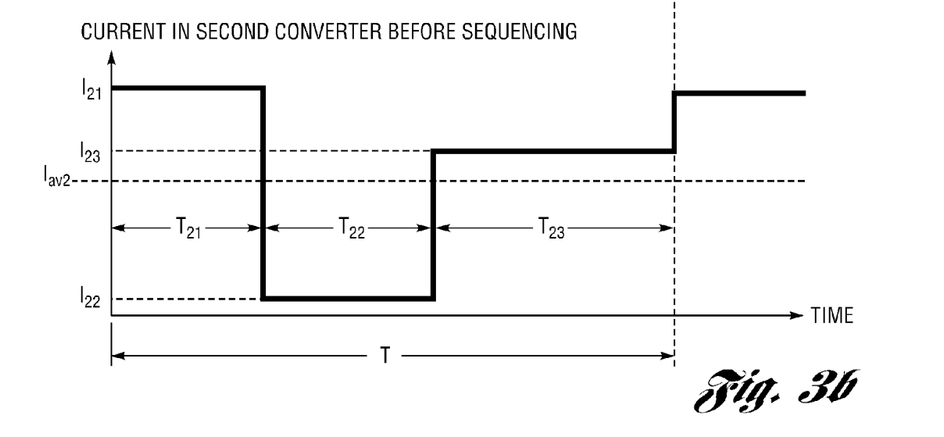
FIG. 3b is a current diagram illustrating current flow in the second converter with period T without switching states of the second converter being sequenced in accordance with one embodiment.

FIGS. 3a-3b illustrate current diagrams illustrating current flow in the first and second converters 14, 16 without the preliminary switching states of either the first or second converters 14, 16 being sequenced to reduce a difference of sums of net currents $i_{bus1}$, $i_{bus2}$ between adjacent time intervals. The first and second net currents $i_{bus1}$, $i_{bus2}$ shown in FIGS. 3a-3b correspond to estimated first and second net currents $i_{bus1}$, $i_{bus2}$ expected in each of the converters 14, 16 relative to the DC-bus capacitor 32 based on the preliminary switching states of the first and second converters 14, 16. Thus, the preliminary switching states of the first and second converters 14, 16 are not physically realized in the first and second converters 14, 16 until the controller 30 sequences them to reduce a difference of sums of net currents $i_{bus1}$, $i_{bus2}$ between adjacent time intervals.

Current diagrams of FIGS. 3a-3b show current flow through the first and second converters 14, 16 with the converters 14, 16 operating at a common period T. During the common period T, net current $i_{bus1}$ has different current levels $I_{11}$, $I_{12}$, $I_{13}$ that flow through the first converter 14 at respective time intervals $T_{11}$, $T_{12}$, $T_{13}$. Similarly, net current $i_{bus2}$ has different current levels $I_{21}$, $I_{22}$, $I_{23}$ that flow through the first converter 14 at respective time intervals $T_{21}$, $T_{22}$, $T_{23}$. The net currents $i_{bus1}$, $i_{bus2}$ of FIGS. 3a-3b are aligned at the beginning of the common period T. The controller 30 can obtain preliminary switching states of the first and second converters 14, 16 and therefore the expected net currents $i_{bus1}$, $i_{bus2}$ of FIGS. 3a-3b based on, for example, desired voltage inputs for the first and second sets of windings 22, 24.

The example waveforms of $i_{bus1}$, $i_{bus2}$ in FIGS. 3a-3e are each with three distinct current levels. However, each of the three distinct current levels could be with more or fewer numbers of segments at different current levels and different time lengths.

The controller 30 may sequence the switching states based on the durations and current amplitudes of the active and the reactive states in the first and second converters 14, 16 to obtain the desired net current $i_{bus1}$, $i_{bus2}$ in the respective converters 14, 16. During the active states of the first and the second converters 14 and 16, the corresponding DC bus currents $i_{bus1}$ and/or $i_{bus2}$ are nonzero. It receives energy from the DC bus 28 if it is a positive value, or pumps energy back to the DC bus 28 if it is a negative one. On the other hand, the corresponding DC bus current is zero in the reactive states. Depending on the machine power flow and the switching states, the reactive states could be at the lowest level in a period, at the highest level, or somewhere in between. If it is at the lowest level in a period, all other states are with positive currents. If it is at the highest level, all other states are with negative currents. If it is somewhere in between, the states above the reactive state is with positive currents and those below are with negative currents.

Figures 3C, 3D:
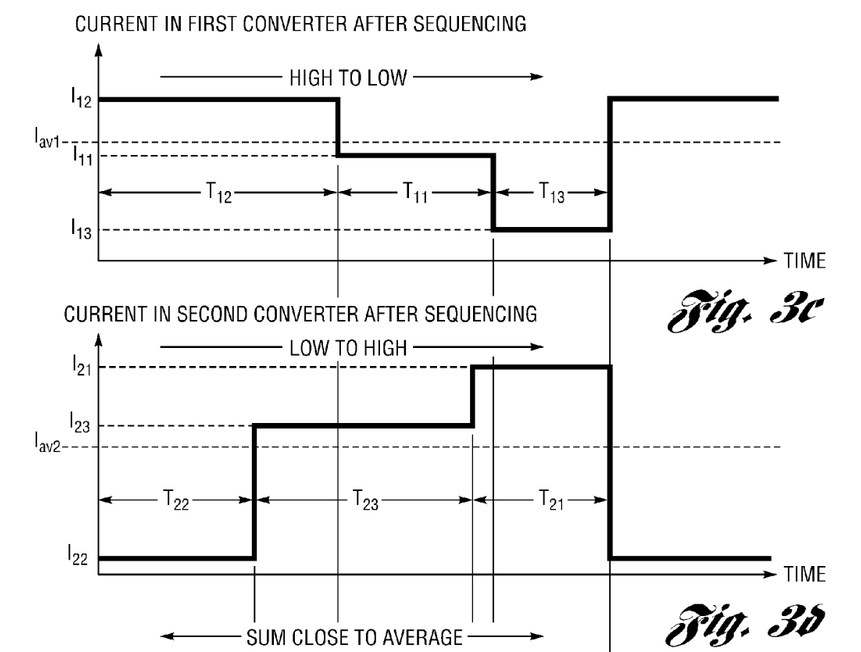
FIG. 3c is a current diagram illustrating current flow in the first converter with period T with the switching states of the first converter of FIG. 3a being sequenced in accordance with one embodiment.
FIG. 3d is a current diagram illustrating current flow in the second converter with period T with the switching states of the second converter of FIG. 3b being sequenced in accordance with one embodiment.

FIG. 3c illustrates net current $i_{bus1}$ in the first converter 14 with the switching states of the first converter 14 associated with FIG. 3a being sequenced to obtain levels of net current $i_{bus1}$ sequenced from highest to lowest levels within period T. The controller 30 can sequence the switching states of the first converter 14 to sequence levels of net current $i_{bus1}$ from highest to lowest. In other words, the controller 30 can sequence the switching states to arrange switching states of the first converter 14 from highest to lowest current during each switching interval or moving window for the first converter 14. For example, the controller 30 may sequence the net current $i_{bus1}$ in FIG. 3a starting from $I_{12}$, then $I_{11}$, and then $I_{13}$ over the common period T as illustrated in FIG. 3c. When the controller 30 sequences current levels in the sequence of $I_{12}$, $I_{11}$, $I_{13}$ over the common period T, net current $i_{bus1}$ flow through the first converter 14 may change at either at the beginning or the end of consecutive time intervals $T_{12}$, $T_{11}$, $T_{13}$. Also, the sequencing strategy may be changed while moving the window forward. For example, the states may be sequenced with current amplitudes from the highest level to the lowest level in the existing window frame, while the current is arranged from the lowest level to the highest level in the next window frame.

FIG. 3d illustrates net current $i_{bus2}$ in the second converter 16 with the switching states of the second converter 16 associated with FIG. 3b being sequenced relative to the first converter 14 to reduce a difference of sums of the first and second net currents $i_{bus1}$, $i_{bus2}$ between adjacent time intervals. As shown in FIG. 3d, the switching states of the second converter 16 associated with FIG. 3b are sequenced to obtain levels of net current $i_{bus2}$ sequenced from lowest to highest levels within period T. The controller 30 can sequence the switching states of the second converter 16 to sequence levels of net current $i_{bus2}$ from lowest to highest. For example, the controller 30 can sequence the net current $i_{bus2}$ in FIG. 3b starting from $I_{22}$, then $I_{23}$, then $I_{21}$ over the common period T as illustrated in FIG. 3d. When the controller 30 sequences current levels in the sequence of $I_{22}$, $I_{23}$, $I_{21}$ over the common period T, net current $i_{bus2}$ flow through the first converter 14 may change at either at the beginning or the end of consecutive time intervals $T_{22}$, $T_{23}$, $T_{21}$.

With reference to FIGS. 3c-3d, the controller 30 can sequence an unsequenced lowest current switching state of the second converter 16 to overlap with an unsequenced highest current switching state of the first converter 14, or vice versa. As shown, the controller 30 may sequence a switching state associated net current $i_{bus1}$ at $I_{22}$ to overlap with a switching state associated with net current $i_{bus2}$ at $I_{12}$, a switching state associated net current $i_{bus1}$ at $I_{23}$ to overlap with a switching state associated with net current $i_{bus2}$ at $I_{11}$, a switching state associated net current $i_{bus1}$ at $I_{21}$ to overlap with a switching state associated with net current $i_{bus2}$ at $I_{13}$, or a combination thereof.

With continuing reference to FIGS. 3c-3d, the controller 30 can repeatedly arrange unsequenced switching states to overlap lowest current of the unsequenced states of the second converter 16 with highest current of the unsequenced states of the first converter 14 from one switching interval to the next switching interval. Furthermore, the controller 30 may repeatedly select between unsequenced lowest-remaining current switching states of the second converter 16 and unsequenced highest-remaining current switching states of the first converter 14 based on duration and current amplitude of previously sequenced switching states of the first and second converters 14, 16.

As shown in FIGS. 3c-3d, the controller 30 can sequence the switching states of the first and second converters 14, 16 to change the pattern of net currents $i_{bus1}$, $i_{bus2}$ relative to each other. For example, the controller 30 can sequence an unsequenced switching state associated with lowest current among remaining unsequenced switching states of the second converter 16 to overlap with an unsequenced switching state associated with highest current among remaining unsequenced switching states of the first converter 14.

Referring again to FIGS. 3c-3d, the controller 30 may repeatedly select between unsequenced lowest-remaining current switching states of the first converter 14 and unsequenced highest-remaining current switching states of the second converter 16 to overlap the unsequenced lowest-remaining current switching state of the first converter 14 with a previously sequenced switching state of the second converter 16. Likewise, the controller 30 may repeatedly select between unsequenced lowest-remaining current switching states of the first converter 14 and unsequenced highest-remaining current switching states of the second converter 16 to overlap the unsequenced highest-remaining current switching state of the second converter 16 with a previously sequenced switching state of the first converter 14.

Figure 3E:
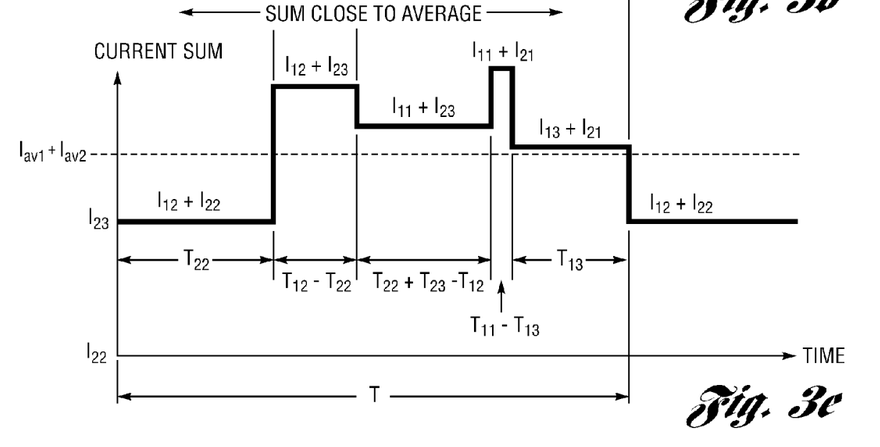
FIG. 3e is a current diagram illustrating a sum of the current flows illustrated in FIGS. 3c-3d in accordance with one embodiment.

FIG. 3e is a current diagram illustrating the sum of the net currents $i_{bus1}$, $i_{bus2}$ illustrated in FIGS. 3c-3d. The sum of the net currents $i_{bus1}$, $i_{bus2}$ illustrated in FIGS. 3c-3d reduces the difference of sums of the net currents $i_{bus1}$, $i_{bus2}$ between adjacent time intervals compared to a sum of the net currents $i_{bus1}$, $i_{bus2}$ illustrated in FIGS. 3a-3b.

Figure 4A:
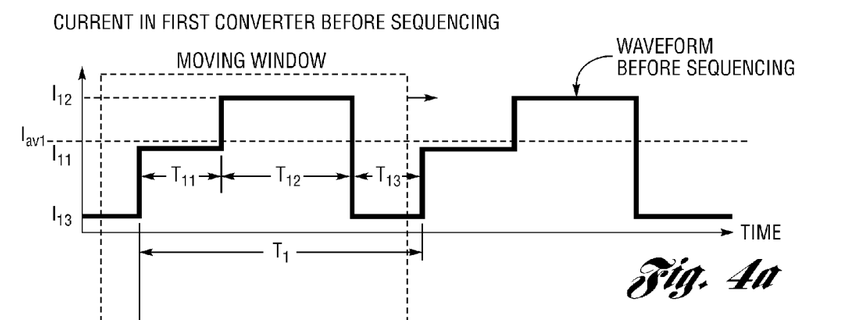
FIG. 4a is a current diagram illustrating current flow in the first converter with period $T_1$ without switching states of the first converter being sequenced in accordance with one embodiment.

FIG. 4a is a current diagram illustrating net current $i_{bus1}$ in the first converter 14 with period $T_1$ without preliminary switching states of the first converter 14 being sequenced.

Figure 4B:
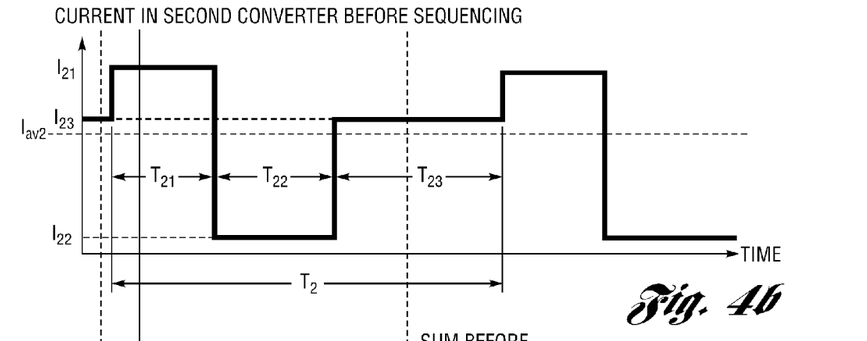
FIG. 4b is a current diagram illustrating current flow in the second converter with period $T_2$ without switching edge alignment between periods $T_2$ and $T_1$ and without the switching states of the second converter being sequenced in accordance with one embodiment.

FIG. 4b is a current diagram illustrating net current $i_{bus2}$ in the second converter 16 with period $T_2$ without the preliminary switching states of the second converter 16 being sequenced. $T_2$ is different from the $T_1$ shown in FIG. 4a.

The net currents $i_{bus1}$, $i_{bus2}$ illustrated in FIGS. 4a-4b do not have switching edge alignment between periods $T_2$ and $T_1$. The net currents $i_{bus1}$, $i_{bus2}$ shown in FIGS. 4a-4b correspond to estimated first and second net currents $i_{bus1}$, $i_{bus2}$ expected in each of the converters 14, 16 relative to the DC-bus capacitor 32 without the preliminary switching states of either the first or second converters 14, 16 being sequenced to reduce a difference of sums of net currents $i_{bus1}$, $i_{bus2}$ between adjacent time intervals.

Current diagrams of FIGS. 4a-4b show current flow through the first and second converters 14, 16 with the converters 14, 16 operating at different periods $T_1$ and $T_2$. $T_2$ of FIG. 4b is greater than $T_1$ shown in FIG. 4a. During the period $T_1$, net current $i_{bus1}$ has different current levels $I_{11}$, $I_{12}$, $I_{13}$ that flow through the first converter 14 at respective time intervals $T_{11}$, $T_{12}$, $T_{13}$. Similarly, net current $i_{bus2}$ has different current levels $I_{21}$, $I_{22}$, $I_{23}$ that flow through the first converter 14 at respective time intervals $T_{21}$, $T_{22}$, $T_{23}$. The net currents $i_{bus1}$, $i_{bus2}$ of FIGS. 4a-4b are not aligned at the beginning of the periods $T_1$ and $T_2$. The controller 30 can obtain preliminary switching states of the first and second converters 14, 16 and therefore the expected net currents $i_{bus1}$, $i_{bus2}$ illustrated in FIGS. 4a-4b based on, for example, desired voltage inputs for the first and second sets of windings 22, 24. The waveforms in FIGS. 4a-4b are each with three different current levels. However, each of the three distinct current levels could be with more or fewer current levels and time lengths.

Figure 4C:
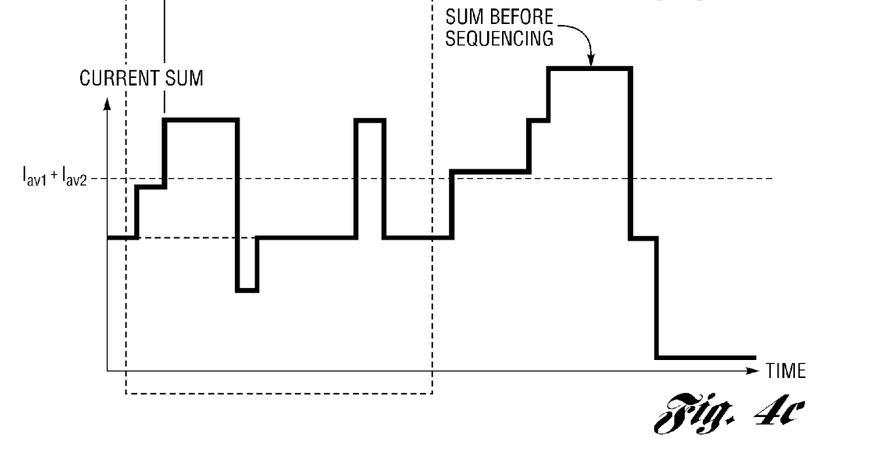
FIG. 4c is a current diagram illustrating a sum of the current flows illustrated in FIGS. 4a-4b in accordance with one embodiment.

FIG. 4c is a current diagram illustrating the sum of the net currents $i_{bus1}$, $i_{bus2}$ illustrated in FIGS. 4a-4b. The sum of the net currents $i_{bus1}$, $i_{bus2}$ illustrated in FIGS. 4a-4b may not be optimal for reducing ripple current in the DC-bus capacitor 32.

Figure 4D:
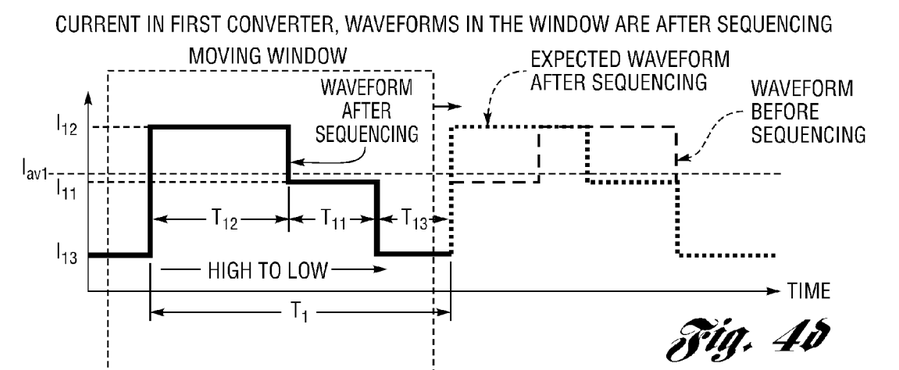
FIG. 4d is a current diagram illustrating current flow in the first converter with period $T_1$ with the switching states of the first converter of FIG. 4a being sequenced in accordance with one embodiment.

FIG. 4d illustrates net current $i_{bus1}$ in the first converter 14 with the switching states of the first converter 14 associated with FIG. 4a being sequenced to obtain levels of net current $i_{bus1}$ sequenced from highest to lowest levels within the moving window as shown in FIG. 4, where the length of the window can be equal to, longer, or shorter than the period $T_1$ or $T_2$. The controller 30 can sequence the switching states of the first converter 14 to sequence levels of net current $i_{bus1}$ from highest to lowest. In other words, the controller 30 can sequence the switching states to arrange switching states of the first converter 14 from highest to lowest current during each switching interval or moving window for the first converter 14. For example, the controller 30 may sequence the net current $i_{bus1}$ in FIG. 4a starting from $I_{12}$, then $I_{11}$, and then $I_{13}$ in the moving window as illustrated in FIG. 4d. When the controller 30 sequences current levels in the sequence of $I_{12}$, $I_{11}$, $I_{13}$ in the moving window, net current $i_{bus1}$ flow through the first converter 14 may change at either at the beginning or the end of consecutive time intervals $T_{12}$, $T_{11}$, $T_{13}$.

Figure 4E:
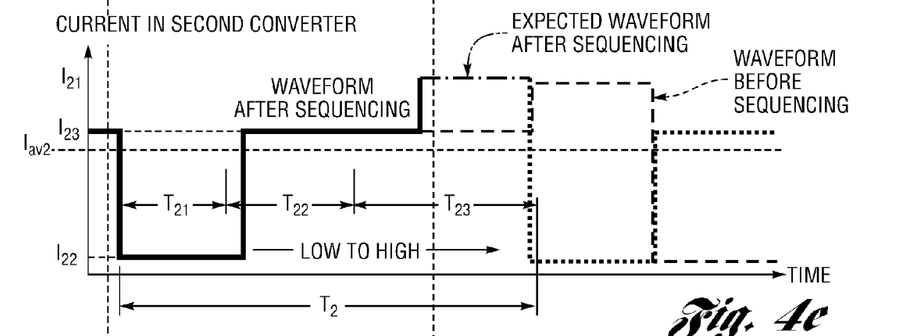
FIG. 4e is a current diagram illustrating current flow in the second converter with period $T_2$ with the switching states of the second converter of FIG. 4b being sequenced in accordance with one embodiment.

FIG. 4e illustrates net current $i_{bus2}$ in the second converter 16 with the switching states of the second converter 16 associated with FIG. 4b being sequenced relative to the first converter 14 to reduce a difference of sums of the first and second net currents $i_{bus1}$, $i_{bus2}$ between adjacent time intervals, such as defined by the moving window. As shown in FIG. 4e, the switching states of the second converter 16 associated with FIG. 4b are sequenced to obtain levels of net current $i_{bus2}$ sequenced from lowest to highest levels within the moving window. The controller 30 can sequence the switching states of the second converter 16 to sequence levels of net current $i_{bus2}$ from lowest to highest. For example, the controller 30 can sequence the net current $i_{bus2}$ in FIG. 4b from $I_{21}$, then $I_{22}$, then $I_{23}$ over the moving window as illustrated in FIG. 4e. When the controller 30 sequences current levels in the sequence of $I_{22}$, $I_{23}$, $I_{21}$ over the moving window, net current $i_{bus2}$ flow through the second converter 16 may change at either at the beginning or the end of consecutive time intervals $T_{21}$, $T_{22}$, $T_{23}$.

With reference to FIGS. 4d-4e, the controller 30 can sequence an unsequenced lowest current switching state of the second converter 16 to overlap with an unsequenced highest current switching state of the first converter 14, or vice versa. As shown, the controller 30 may sequence a switching state associated net current $i_{bus1}$ at $I_{12}$ to overlap with a switching state associated with net current $i_{bus2}$ at $I_{22}$, a switching state associated net current $i_{bus1}$ at $I_{11}$ to overlap with a switching state associated with net current $i_{bus2}$ at $I_{23}$, a switching state associated net current $i_{bus1}$ at $I_{13}$ to overlap with a switching state associated with net current $i_{bus2}$ at $I_{23}$, then $I_{21}$, or a combination thereof.

With continuing reference to FIGS. 4d-4e, the controller 30 can repeatedly arrange unsequenced switching states to overlap lowest current of the unsequenced states of the second converter 16 with highest current of the unsequenced states of the first converter 14 from one switching interval to the next switching interval. Furthermore, the controller 30 may repeatedly select between unsequenced lowest-remaining current switching states of the second converter 16 and unsequenced highest-remaining current switching states of the first converter 14 based on duration and current amplitude of previously sequenced switching states of the first and second converters 14, 16.

As shown in FIGS. 4d-4e, the controller 30 can sequence the switching states of the first and second converters 14, 16 to change the pattern of net currents $i_{bus1}$, $i_{bus2}$ relative to each other. For example, the controller 30 can sequence an unsequenced switching state associated with lowest current among remaining unsequenced switching states of the second converter 16 to overlap with an unsequenced switching state associated with highest current among remaining unsequenced switching states of the first converter 14.

Referring again to FIGS. 4d-4e, the controller 30 may repeatedly select between unsequenced lowest-remaining current switching states of the first converter 14 and unsequenced highest-remaining current switching states of the second converter 16 to overlap the unsequenced lowest-remaining current switching state of the first converter 14 with a previously sequenced switching state of the second converter 16. Likewise, the controller 30 may repeatedly select between unsequenced lowest-remaining current switching states of the first converter 14 and unsequenced highest-remaining current switching states of the second converter 16 to overlap the unsequenced highest-remaining current switching state of the second converter 16 with a previously sequenced switching state of the first converter 14.

Figure 4F:
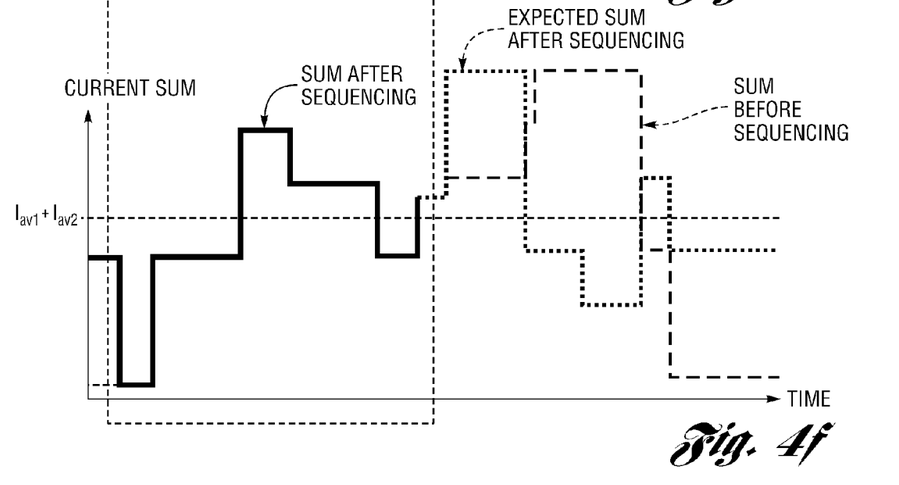
FIG. 4f is a current diagram illustrating a sum of the current flows illustrated in FIGS. 4d-4e in accordance with one embodiment.

FIG. 4f is a current diagram illustrating the sum of the net currents $i_{bus1}$, $i_{bus2}$ illustrated in FIGS. 4d-4e. The sum of the net currents $i_{bus1}$, $i_{bus2}$ illustrated in FIGS. 4d-4e reduces the difference of sums of the net currents $i_{bus1}$, $i_{bus2}$ between adjacent time intervals compared to the sum of the net currents $i_{bus1}$, $i_{bus2}$ illustrated in FIG. 4c.

Once the controller 30 sequences the preliminary switching states to reduce the difference of sums of the net currents $i_{bus1}$, $i_{bus2}$ between adjacent time intervals, the controller 30 controls operation of the power switches $S_{a1}$, $S_{a2}$, $S_{b1}$, $S_{b2}$, $S_{c1}$, and $S_{c2}$ to provide the desired voltage level at the first and second sets of windings 22, 24. For example, the controller 30 may operate as a pulse width modulating controller to pulse-width modulate switching control signals for the first and second converters 14, 16.

As shown in FIGS. 1-2, the controller 30 transmits at least one control signal 36 to the power converter system 12 to control operation of the power switches. For example, the control signal 36 may include a set of pulse width modulating signals that may be generated by well-know sine-triangle method, space vector techniques, or other modulating means.

The power converter system 12 receives the control signal 36 to control the switching configuration of the converters 14, 16 and therefore the current flow through the respective phase legs in each of the converters 14, 16 as well as net currents $i_{bus1}$, $i_{bus2}$ flow with respect to the first and second sets of windings 22, 24. The switching configuration is a set of switching states of the power switches $S_{a1}$, $S_{a2}$, $S_{b1}$, $S_{b2}$, $S_{c1}$, and $S_{c2}$ in the converters 14 and 16. In general, the switching configuration of the converters 14 and 16 determines how the converters 14 and 16 convert power between the DC power link 26 and the AC machine 20 in FIG. 1 or machines 20 and 20' in FIG. 2.

To control the switching configuration of the converters 14, 16, the switching state of each power switch $S_{a1}$, $S_{a2}$, $S_{b1}$, $S_{b2}$, $S_{c1}$, and $S_{c2}$ in the converters 14, 16 is controlled to either an ON state or an OFF state based on the control signal 36. In the illustrated embodiment, the converters 14, 16 control the gate voltage applied to each power switch to switch the power switches to either ON or OFF states, and therefore the switching state of each power switch. Gate voltages applied to power switches $S_{a1}$, $S_{a2}$, $S_{b1}$, $S_{b2}$, $S_{c1}$, and $S_{c2}$ control the switching state of the respective power switches. While the converters 14, 16 are shown as voltage-driven devices in FIGS. 1-2, the converters 14, 16 may be current-driven devices or controlled by other strategies that switch power switches $S_{a1}$, $S_{a2}$, $S_{b1}$, $S_{b2}$, $S_{c1}$, and $S_{c2}$ between ON and OFF states.

As described above, various embodiments according to the present disclosure control the switching states of the power converter system in response to the directions of current flow to reduce ripple current in the DC-bus capacitor, which may facilitate use of a smaller and generally less-expensive capacitor for a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein as less desirable than other embodiments or prior art implementations with respect to one or more characteristics are not outside the scope of the disclosure and may be desirable for particular applications.

What is claimed is:

1. A method of controlling a power converter system with a direct current bus capacitor connected to at least a first converter and a second converter, the method comprising:
   establishing switching states with associated current patterns for the first and second converters; and
   sequencing the switching states such that an unsequenced switching state associated with lowest current of the second converter overlaps with an unsequenced switching state associated with highest current of the first converter.

2. The method of claim 1 wherein the switching states include active states and reactive states, the method further including identifying a duration of the active and the reactive states in the first and second converters, and sequencing the switching states based on the durations and current amplitudes.

3. The method of claim 1 wherein the current patterns correspond to estimated currents expected in each of the converters relative to the direct current bus capacitor based on the switching states of the first and second converters.

4. The method of claim 1 wherein sequencing the switching states includes sequencing an unsequenced switching state associated with lowest current among remaining unsequenced switching states of the second converter to overlap with an unsequenced switching state associated with highest current among remaining unsequenced switching states of the first converter.

5. The method of claim 1 further comprising repeatedly arranging unsequenced switching states to overlap lowest current pattern values of the unsequenced switching states of the second converter with highest current pattern values of the unsequenced switching states of the first converter.

6. The method of claim 1 wherein sequencing the switching states includes arranging switching states of the first converter from highest to lowest current during a switching interval.

7. The method of claim 1 wherein sequencing the switching states further includes repeatedly selecting between unsequenced lowest-remaining current switching states of the second converter and unsequenced highest-remaining current switching states of the first converter based on duration and current amplitude of previously sequenced switching states of the first and second converters.

8. The method of claim 7 wherein repeatedly selecting between unsequenced lowest-remaining current switching states of the second converter and unsequenced highest-remaining current switching states of the first converter includes overlapping the unsequenced lowest-remaining current switching state of the second converter with a previously sequenced switching state of the first converter.

9. The method of claim 7 wherein repeatedly selecting between unsequenced lowest-remaining current switching states of the second converter and unsequenced highest-remaining current switching states of the first converter includes overlapping the unsequenced highest-remaining current switching state of the first converter with a previously sequenced switching state of the second converter.

10. A system for controlling a power converter system with a direct current bus capacitor connected to a first converter with associated first current and a second converter with associated second current, the system comprising:
    at least one logic device configured to establish switching states of the first and second converters and sequence the switching states based on a difference between an average current ($I_{av1}+I_{av2}$) and a sum of the associated first and second currents.

11. The system of claim 10 wherein the switching states include active states and reactive states, the logic device being further configured to identify a duration of the active and the reactive states in the first and second converters, and to sequence the switching states based on the durations and current amplitudes.

12. The system of claim 10 wherein the first and second currents correspond to estimated first and second currents expected in each of the converters relative to the direct current bus capacitor based on the switching states of the first and second converters.

13. The system of claim 10 wherein the logic device is further configured to sequence an unsequenced switching state associated with lowest current among remaining unsequenced switching states of the second converter to overlap with an unsequenced switching state associated with highest current among remaining unsequenced switching states of the first converter.

14. The system of claim 10 wherein the logic device is a controller including a processor operable to execute software instructions, a computer memory operable to store software instructions accessible by the processor, and a set of software instructions stored in the memory to establish the switching states of the first and second converters and sequence the switching states of the second converter relative to the first converter to reduce the difference between the average current ($I_{av1}+I_{av2}$) and the sum of the associated first and second currents.

15. At least one logic storage medium having logic-device-readable code embodied thereon for performing a method of controlling a power converter system with a direct current bus capacitor connected to a first converter and a second converter, the method comprising:
    establishing switching states of the first and second converters; and
    sequencing the switching states such that an unsequenced lowest current switching state of the second converter overlaps with an unsequenced highest current switching state of the first converter.

16. The storage medium of claim 15 wherein the storage medium is computer memory and the logic-device-readable code is computer-readable code.

17. The storage medium of claim 15 wherein the storage medium is a processor-readable storage medium and the logic-device-readable code is processor-readable code embodied thereon for programming at least one processor to perform the method.

18. The storage medium of claim 15 wherein sequencing the switching states includes:
    repeatedly selecting between unsequenced lowest-remaining current switching states of the second converter and unsequenced highest-remaining current switching states of the first converter based on duration and current amplitude of previously sequenced switching states of the first and second converters; and
    overlapping the unsequenced lowest-remaining current switching state of the second converter with a previously sequenced switching state of the first converter.

* * * * *